(12) United States Patent
Peck

(10) Patent No.: US 6,846,454 B2
(45) Date of Patent: Jan. 25, 2005

(54) FLUID EXIT IN REACTION CHAMBERS

(75) Inventor: Bill J. Peck, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 423 days.

(21) Appl. No.: 10/035,789

(22) Filed: Dec. 24, 2001

(65) Prior Publication Data

US 2003/0118717 A1 Jun. 26, 2003

(51) Int. Cl.$^7$ ................................................ B01L 1/00
(52) U.S. Cl. ............................ 422/63; 422/104; 422/134
(58) Field of Search ........................ 422/104, 130–131, 422/134, 63; 55/385.4; 436/36

(56) References Cited

U.S. PATENT DOCUMENTS

| | | | |
|---|---|---|---|
| 1,833,239 A | | 11/1931 | Von Reis |
| 3,973,916 A | * | 8/1976 | Shelton ...................... 422/174 |
| 4,714,541 A | * | 12/1987 | Buyan et al. ................ 208/161 |
| 4,749,400 A | | 6/1988 | Mouly et al. |
| 4,981,785 A | * | 1/1991 | Nayak ........................ 435/7.94 |
| 5,103,742 A | * | 4/1992 | Valentino .................... 110/215 |
| 5,322,799 A | * | 6/1994 | Miller et al. ................. 436/165 |
| 5,449,754 A | | 9/1995 | Nishioka |
| 5,472,672 A | * | 12/1995 | Brennan ...................... 422/131 |
| 5,474,796 A | | 12/1995 | Brennan |
| 5,529,756 A | * | 6/1996 | Brennan ...................... 422/131 |
| 5,612,006 A | * | 3/1997 | Fisk ............................ 422/171 |
| 5,641,457 A | * | 6/1997 | Vardanega et al. ....... 422/82.01 |
| 5,658,540 A | * | 8/1997 | Valentino .................... 423/210 |
| 5,658,802 A | | 8/1997 | Hayes et al. |
| 5,677,195 A | | 10/1997 | Winkler et al. |
| 5,807,522 A | | 9/1998 | Brown et al. |
| 5,985,551 A | | 11/1999 | Brennan |
| 6,001,311 A | * | 12/1999 | Brennan ...................... 422/131 |
| 6,054,100 A | | 4/2000 | Stanchfield et al. |
| 6,083,763 A | | 7/2000 | Balch |
| 6,136,269 A | | 10/2000 | Winkler et al. |
| 6,180,351 B1 | | 1/2001 | Cattell |
| 6,183,558 B1 | | 2/2001 | Otake et al. |
| 6,210,894 B1 | | 4/2001 | Brennan |
| 6,242,266 B1 | * | 6/2001 | Schleifer et al. ............ 436/518 |
| 6,372,483 B2 | * | 4/2002 | Schleifer et al. ......... 435/287.1 |
| 6,656,432 B1 | * | 12/2003 | Hirota et al. ................ 422/100 |
| 6,713,023 B2 | * | 3/2004 | Bass et al. ................... 422/102 |
| 6,730,517 B1 | * | 5/2004 | Koster et al. ................ 436/47 |
| 6,746,649 B2 | * | 6/2004 | McEntee ..................... 422/102 |
| 2001/0010916 A1 | * | 8/2001 | Schleifer et al. ............... 435/6 |
| 2001/0022950 A1 | * | 9/2001 | Hall et al. ................... 422/131 |
| 2003/0069411 A1 | * | 4/2003 | Brennan ..................... 536/25.3 |
| 2003/0118482 A1 | * | 6/2003 | Peck ............................ 422/99 |
| 2003/0118716 A1 | * | 6/2003 | Bass et al. ................. 427/2.11 |
| 2003/0118717 A1 | * | 6/2003 | Peck ........................ 427/2.11 |

(List continued on next page.)

OTHER PUBLICATIONS

Perry's Chemical Engineers' Handbook, Sixth Edition, 1984, (5–6).*

Primary Examiner—Kiley S. Stoner

(57) ABSTRACT

Apparatus and methods are disclosed for controlling flow of fluid inside a chamber. A device comprises a chamber comprising at least one wall, a first opening for introducing a fluid into the interior of the chamber, and a second opening opposite the first opening. The at least one wall of the chamber is designed to provide a contracting section, a section having substantially constant cross-sectional area and a diffusing section through the chamber from the first opening to the second opening. The device may be employed as a gas outlet in a reaction chamber for conducting reactions where it is desired to control the internal atmosphere of the reaction chamber. The apparatus may be employed in the manufacture of biopolymers on the surface of a support such as an array of biopolymer features on the support. Also disclosed is a holding element for a support wherein the holding element is a low drag body.

20 Claims, 4 Drawing Sheets

U.S. PATENT DOCUMENTS

2003/0118718 A1 * 6/2003 Hilson et al. ............... 427/2.11
2003/0156989 A1 * 8/2003 Safir et al. .................... 422/99
2003/0170148 A1 * 9/2003 McEntee et al. ............ 422/102
2003/0228422 A1 * 12/2003 Bass et al. ............... 427/407.1
2003/0232140 A1 * 12/2003 Remick et al. .............. 427/294
2003/0232343 A1 * 12/2003 Leproust et al. ................ 435/6
2004/0020515 A1 * 2/2004 Tolosko et al. ................ 134/21
2004/0045435 A1 * 3/2004 Golner et al. ................. 95/117

* cited by examiner

FLUID EXIT IN REACTION CHAMBERS

BACKGROUND OF THE INVENTION

This invention relates to chambers for carrying out procedures wherein internal atmospheric conditions, such as, e.g., humidity, of the chamber are controlled. More particularly, the invention relates to devices for carrying out steps in the synthesis of a chemical compound and the exiting of fluids such as gases therefrom. The invention has particular application in the manufacture of supports having bound to the surfaces thereof a plurality of chemical compounds, such as biopolymers, which are prepared on the surface in a series of steps.

In the field of diagnostics and therapeutics, it is often useful to attach species to a surface. One important application is in solid phase chemical synthesis wherein initial derivatization of a substrate surface enables synthesis of polymers such as oligonucleotides and peptides on the substrate itself. Support bound oligomer arrays, particularly oligonucleotide arrays, may be used in screening studies for determination of binding affinity. Modification of surfaces for use in chemical synthesis has been described. See, for example, U.S. Pat. No. 5,624,711 (Sundberg), U.S. Pat. No. 5,266,222 (Willis) and U.S. Pat. No. 5,137,765 (Farnsworth).

Determining the nucleotide sequences and expression levels of nucleic acids (DNA and RNA) is critical to understanding the function and control of genes and their relationship to, for example, disease discovery and disease management. Analysis of genetic information plays a crucial role in biological experimentation. This has become especially true with regard to studies directed at understanding the fundamental genetic and environmental factors associated with disease and the effects of potential therapeutic agents on the cell. Such a determination permits the early detection of infectious organisms such as bacteria, viruses, etc.; genetic diseases such as sickle cell anemia; and various cancers. This paradigm shift has lead to an increasing need within the life science industries for more sensitive, more accurate and higher-throughput technologies for performing analysis on genetic material obtained from a variety of biological sources.

Unique or misexpressed nucleotide sequences in a polynucleotide can be detected by hybridization with a nucleotide multimer, e.g., oligonucleotide, probe. Hybridization is based on complementary base pairing. When complementary single stranded nucleic acids are incubated together, the complementary base sequences pair to form double stranded hybrid molecules. These techniques rely upon the inherent ability of nucleic acids to form duplexes via hydrogen bonding according to Watson-Crick base-pairing rules. The ability of single stranded deoxyribonucleic acid (ssDNA) or ribonucleic acid (RNA) to form a hydrogen bonded structure with a complementary nucleic acid sequence has been employed as an analytical tool in molecular biology research. An oligonucleotide probe employed in the detection is selected with a nucleotide sequence complementary, usually exactly complementary, to the nucleotide sequence in the target nucleic acid. Following hybridization of the probe with the target nucleic acid, any oligonucleotide probe/nucleic acid hybrids that have formed are typically separated from unhybridized probe. The amount of oligonucleotide probe in either of the two separated media is then tested to provide a qualitative or quantitative measurement of the amount of target nucleic acid originally present.

Direct detection of labeled target nucleic acid hybridized to surface-bound polynucleotide probes is particularly advantageous if the surface contains a mosaic of different probes that are individually localized to discrete, known areas or sites of the surface. Such ordered arrays containing a large number of oligonucleotide probes have been developed as tools for high throughput analyses of genotype and gene expression. Oligonucleotides synthesized on a solid support recognize uniquely complementary nucleic acids by hybridization, and arrays can be designed to define specific target sequences, analyze gene expression patterns or identify specific allelic variations. The arrays may be used for conducting cell study, for diagnosing disease, identifying gene expression, monitoring drug response, determination of viral load, identifying genetic polymorphisms, analyze gene expression patterns or identify specific allelic variations, and the like.

In one approach, cell matter is lysed, to release its DNA as fragments, which are then separated out by electrophoresis or other means, and then tagged with a fluorescent or other label. The resulting DNA mix is exposed to an array of oligonucleotide probes, whereupon selective binding to matching probe sites takes place. The array is then washed and interrogated to determine the extent of hybridization reactions. In one approach the array is imaged so as to reveal for analysis and interpretation the sites where binding has occurred. Arrays of different chemical probe species provide methods of highly parallel detection, and hence improved speed and efficiency, in assays. Assuming that the different sequence polynucleotides were correctly deposited in accordance with the predetermined configuration, then the observed binding will be indicative of the presence and/or concentration of one or more polynucleotide components of the sample.

The arrays may be microarrays created by in-situ synthesis of biopolymers such as polynucleotides, including oligonucleotides, and polypeptides or by deposition of molecules such as oligonucleotides, cDNA and so forth. In general, arrays are synthesized on a surface of a substrate by one of any number of synthetic techniques that are known in the art. In one approach to the synthesis of microarrays, an apparatus is employed that comprises a reaction chamber and a device for dispensing reagents to the surface of a substrate at discrete sites. A positioning system, which may be a robotic manipulator, moves the substrate to the chamber, in which at least a portion of the device for dispensing reagents is housed. Alternatively, the device for dispensing reagents may be moved in and out of the chamber. A controller controls the application of the reagents to the substrate according to predetermined procedures. The positioning system may comprise one or more stages for moving the substrate to various positions for the dispensing of reagents thereon. The stages may be, for example, an x,y-stepper stage, a theta stage, a rotational stepper stage, and the like.

To produce arrays it is important to reproducibly perform reactions at a particular site without affecting adjacent sites. The reaction should approximate stoichiometry in producing the desired product. Since many of the reactions are performed stepwise, any failure during the synthesis results in the wrong product. The site for each reaction must be defined so that the reaction occurs in a rapid and efficient manner. Each step in the process should provide for a reproducible result and not interfere with the next stage or the reaction at a different site.

Since the arrays provide for a large number of different compounds, the process requires many steps. With oligonucleotides, an in situ synthesis is employed wherein each monomer addition involves a plurality of steps, so that the synthesis at each site involves the number of steps for each addition multiplied by the number of monomers in the oligonucleotide. In order to be able to produce arrays of oligonucleotides efficiently, automated systems are preferred to provide for the accurate placement of reagents, efficient reaction, close packing of different compounds and the indexing of individual oligonucleotides with a particular site in the array.

In situ syntheses generally require a controlled environment in the reaction chamber. For example, many syntheses require an anhydrous environment to avoid the destructive effects of exposing chemical reagents to humidity present in the ambient atmosphere. Typically, an anhydrous chamber is created by enclosing the device for dispensing reagents in a reaction chamber through which dry gas is purged. The gas is delivered into the reaction chamber by means of an inlet, usually a single inlet. Such a technique fails to provide reliably consistent ambient humidity levels because of the turbulent flow that is achieved.

As mentioned above, in certain embodiments of some known reaction chambers, a positioning system, which may be a robotic manipulator, moves the substrate into and out of the reaction chamber through an opening in a wall of the chamber. Generally, the opening serves as an exit for a fluid, usually, a dry gas, that is flowing through the reaction chamber to purge the interior of the chamber in an attempt to provide a moisture-free environment inside the chamber. The opening in the wall is configured in several different ways. In one approach a door is employed. The door may be a pivotally mounted door, a flapper door, a sliding door and the like. In another approach, an air lock transfer station is employed. In operation, the flowing gas exits through the opening in the wall where the door or transfer station provides some degree of protection against air outside the chamber flowing into the interior of the chamber. When it is desired to have the substrate inside the chamber, the door is moved to the open position and the substrate mounted in a suitable holding element is inserted into the interior of the chamber by means of a suitable mechanism such as a robotic arm.

Door-based designs suffer from large-scale flow feature generation near the outlet opening and from highly unsteady flow conditions when the door is opened and closed. For example, if the door is suddenly opened, a region will exist where the boundary layer suddenly separates from the body of the wall surrounding the opening. A separation zone is formed between the exiting gas and the edge, usually, outside edge, of the wall at the opening. Because of very high concentration gradients adjacent the separation zone, outside air can diffuse into the interior of the reaction chamber through this separation zone. The outside air that enters the chamber carries with it moisture from the outside environment, which compromises the anhydrous conditions within the chamber. Furthermore, actuating the door causes fluctuations in pressure. The pressure fluctuations readily initiate three-dimensionality in the flow causing recirculation and subsequent entrainment of moisture into the interior of the chamber.

Other complications resulting from problems with the flow of gas through a chamber include overall low yield in the chemical compounds formed on the surface of the support. Also, undesirable non-uniformity problems with arrays result with arrays because of the very large numbers of features present.

Properly designed air lock transfer stations are able to provide much better protection against the transfer of outside moisture into the interior of the chamber. However, the use of air lock transfer stations significantly lowers throughput speeds. In addition, air lock transfer stations add substantial mechanical and system complexity.

Accordingly, there is a need for a reaction chamber that provides consistent anhydrous conditions within the interior of the chamber. The anhydrous conditions should remain consistent during the insertion and removal of devices into and out of the chamber. Ideally, the reaction chamber should not possess a door or an air transfer station at the opening where the devices are inserted and removed. A steady unidirectional flow of exiting gas through the opening is highly desirable.

SUMMARY OF THE INVENTION

One embodiment of the present invention is a chamber comprising at least one wall, a first opening for introducing a fluid into the interior of the chamber, and a second opening opposite the first opening. The at least one wall of the chamber is designed to provide a contracting section, a section having substantially constant cross-sectional area and a diffusing section through the chamber from the first opening to the second opening.

Another embodiment of the present invention is a device comprising a chamber comprising a pair of side walls, a gas inlet for introducing a gas into the interior of the chamber, and an opening in a wall of the chamber wherein the opening is designed to provide a contracting section, a section having substantially constant cross-sectional area and a diffusing section through the opening.

Another embodiment of the present invention is an apparatus for conducting chemical reactions by depositing drops of reagents on the surface of a support in the form of an array. The apparatus comprises a chamber comprising a gas inlet for introducing a gas into the interior of the chamber. A device for dispensing reagents for conducting the chemical reactions is in fluid communication with the chamber. The chamber also comprises an opening, which is designed to provide a contracting section, a section having substantially constant cross-sectional area and a diffusing section through the opening.

Another embodiment of the present invention is an apparatus for synthesizing a plurality of biopolymers on a support. The apparatus is similar to that described above where the reagents are for synthesizing the biopolymers.

Another embodiment of the present invention is an apparatus for synthesizing a plurality of biopolymers on a support. The apparatus is similar to that described above. At least one wall of the opening is designed such that the opening comprises a contracting section, a section having substantially constant cross-sectional area and a diffusing section. The wall in the contracting section comprises a sloped portion and a curved portion. The sloped portion is very insensitive to the contracting slope and may vary substantially from near zero to 90 degrees. This slope is more dependent on constraints within the coupling chamber. The diffusing section expands at a rate of about 5 to 10 degrees. The apparatus comprises a mechanism for moving the support into and out of the chamber through the opening and for positioning the support relative to the device for dispensing reagents. The mechanism comprises a holding element for the support wherein the holding element is a low drag body having Reynolds numbers that are less than about 3000.

Another embodiment of the present invention is a method for controlling the atmosphere in a reaction chamber. In the method a gas is introduced into the reaction chamber. The gas has a positive and substantially uniform unidirectional flow through the chamber. The gas is allowed to exit the reaction chamber through a gas outlet in a direction that is the same as that of the unidirectional flow. The gas going through the outlet is first contracted and then diffused.

Another embodiment of the present invention is a method for synthesizing a plurality of biopolymers on a support. In the method a support is introduced into a reaction chamber. Discrete sites on the surface of the support are activated for reaction to form the biopolymers. The reaction chamber has a positive and substantially uniform unidirectional flow of gas through the interior of the reaction chamber. The gas exits the reaction chamber through a gas outlet in a direction that is the same as the unidirectional flow. The gas flow through the gas outlet is first contracted and then diffused. The support and a dispensing system for dispensing reagents for the synthesis of the biopolymers are brought into a dispensing position relative to the activated discrete sites on the surface, and the reagents are dispensed to the discrete sites. The support and/or the dispensing system are moved from the relative dispensing position, and the above steps are optionally repeated until the biopolymer is formed.

DETAILED DESCRIPTION OF THE INVENTION

Figure 1:
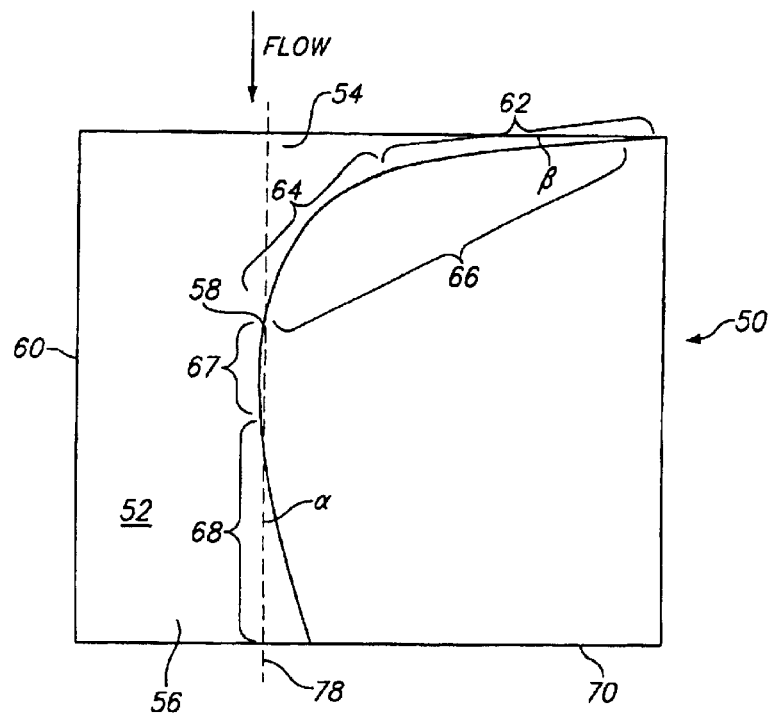
FIG. 1 is a schematic diagram depicting one embodiment of a device in accordance with the present invention.

In its broadest aspect the present device comprises a chamber having a first opening and a second opening opposite the first opening. The geometry of the interior wall or walls of the chamber is such as to form a contracting section, a section having substantially constant cross-sectional area and an expansion section therein. Control of the geometric parameters in the contracting section and expansion section assists in avoiding recirculation of fluid flowing from the first opening to the second opening through the chamber and back flow into the chamber through the second opening.

The contracting section results from the initially gradual and subsequently steep tapering of at least one of the internal side walls of the chamber and, in some embodiments, both internal side walls of the chamber. To achieve the gradual and ultimately steep tapering of the side wall, the wall in the contracting section comprises two different sloped portions, the second portion having a slope more steep than that of the first portion. In the first or initial sloped portion, the distance between the side walls decreases at a rate sufficient to provide the desired level of contraction. From an alternative viewpoint the slope of the wall in the first sloped section is gradual relative to the second sloped section. The purpose of the contracting section is to create a positive pressure gradient as the flow is accelerated. This will tend to keep the boundary layer, i.e., the fluid adjacent the internal surfaces of the chamber, attached to the internal surfaces of the chamber. This phenomenon may be achieved for a wide range of contracting geometries, i.e., the geometries of the first and second sloped sections. The slope should not be too gradual so that the pressure gradient may be overcome in the boundary layer leading to separation. One consideration is that the transition from the inlet of the apparatus to the section of substantially constant cross-sectional area is smooth. This avoids separation of the boundary layer and disturbance to the flow. Most often, the appropriate geometries are determined empirically for a particular application. The contraction ratio can be as low as about 2 or about 3 and as high as about 8 where the contraction ratio is that of the area of contracting section to the area of the section of substantially constant cross-sectional area. This contraction typically takes place over a region from about 0.15 to about 2 times, usually, about 1 to about 2 times, the width of the section having substantially constant cross-sectional area. As the angle gets steeper, centrifugal instabilities may disrupt the flow of fluid as streamlines are bent to converge into the section having substantially constant cross-sectional area resulting in formation of vortices directed in the streamwise direction.

In the second sloped portion, the distance between the side walls decreases at a rate that is substantially greater than the decrease of the distance between the side walls of the first sloped portion. Preferably, the second sloped section is substantially curved rather than substantially linear. The curve may be substantially circular or other such suitable curvature. In one specific embodiment the curved portion is substantially circular.

The section having substantially constant cross-sectional area joins the contracting section and the diffusing section. The primary function of this section is to provide for smooth transition between the contracting section and the diffusing section. Accordingly, the geometry of the section having substantially constant cross-sectional area is such as to connect the contracting section and the diffusing section to provide minimal perturbance to the flow of fluid through the apparatus. In this section there is usually substantially zero pressure gradient and, thus, a susceptibility to boundary layer separation. The length of the section having a substantially constant cross-sectional area is not critical and depends on the particular application of the present apparatus. The area of the section having substantially constant cross-sectional area should be sufficient to avoid a substantial blockage effect, i.e., blockage of the fluid flowing from the contracting section to the diffusing section. That is, when a device is introduced into the apparatus, there is a disturbance of flow and the size of this section should be such as to minimize this disturbance.

The term "substantially" as used herein means that a particular feature is within about 10%, usually, within about 5%, of the designated characteristic. For example, the term "substantially circular" means that the feature is within about 10% of being fully circular, usually, within about 5% of being fully circular.

The diffusing or expansion section of the chamber expands at a rate of about 5 to about 10 degrees.

Accordingly, the distance between the opposing side walls in the expansion section of the chamber increases at a rate of about 0.08 to about 0.18 cm/cm. In another manner of viewing the above, the angle formed by the side wall in the expansion section and an imaginary line parallel to the exterior of the side wall is less than about 10 degrees, usually about 5 to about 8 degrees. The width of the diffusing section, of course, varies because of the above. In general, the length of the diffusing section is about 1 to about 4 times, usually, about 2 to about 3 times the width of the section having a substantially constant cross-sectional area.

When only one of the side walls changes geometry to provide for the contracting section, the section having substantially constant cross-sectional area and the diffusing or expansion section in the chamber, the opposing wall continues in generally straight line. When both of the side walls change geometry, they may change geometry symmetrically or non-symmetrically. In other words the opposing walls in the chamber may or may not have substantially the same geometry in the contracting and expansion sections. In any event the geometry of the opposing walls should be such as to promote flow of fluid through the chamber and exiting of the fluid from the chamber without any significant intake or back flow into the second opening.

Figure 2:
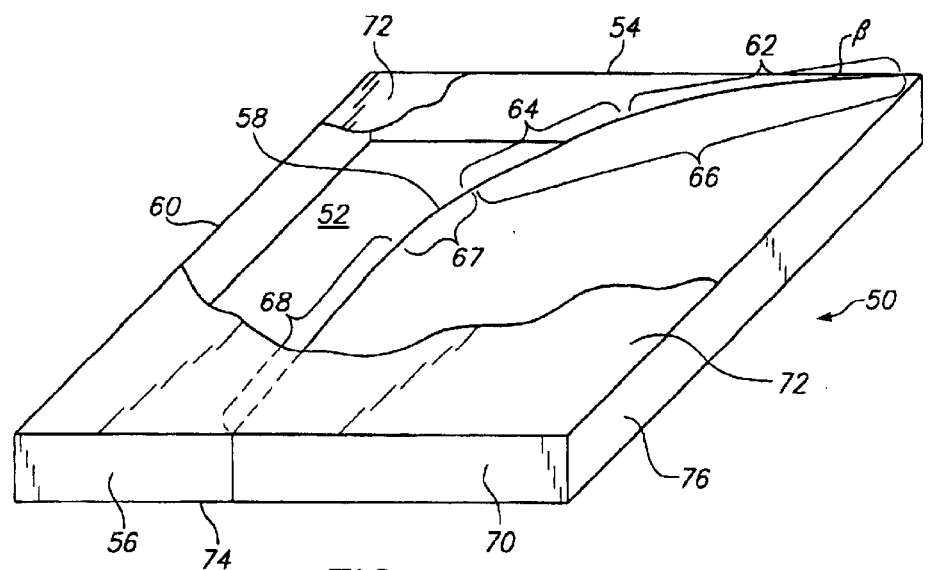
FIG. 2 is a top side, partial cut-away, elevational view of the device of FIG. 1 taken from the top side.

An example of a device in accordance with the present invention is depicted in FIGS. 1 and 2, by way of illustration and not limitation. Device 50 comprises chamber 52 with opening 54 and opening 56. Device 50 also comprises opposing walls 58 and 60. At the beginning of opening 52, wall 58 forms first sloped portion 62, which has a relatively mild slope until second sloped portion 64. As can be seen, the slope of second sloped portion 64 is steep compared to first sloped portion 62. First sloped portion 62 and second sloped portion 64 form a contracting section 66 of wall 58. The geometry of contracting section 66 provides for a contraction of the area of chamber 52 adjacent contracting portion 66. Wall 58 also comprises section 67 having a substantially constant cross-sectional area. Wall 58 further comprises diffusing or expansion portion 68, which is characterized in that its geometry provides for an expansion of the area of chamber 52 adjacent expansion portion 68 and diffusing of fluid passing through device 50. In the embodiment shown in FIG. 1, wall 60 does not change geometry.

Device 50 also comprises partial side wall 70, top wall 72 and bottom wall 74. As can be seen from FIG. 1, the exterior 76 of wall 58 is substantially parallel to wall 60. The angle α formed by contracting section 68 and imaginary line 78, which is parallel to exterior 76 of wall 58 is usually about 5 to about 10 degrees, more usually, about 5 to about 7 degrees. The angle β formed by opening 54 and first sloped portion 62 may be about 0 to about 90 degrees, usually, about 5 to about 45 degrees, more usually, about 10 to about 30 degrees.

In operation, fluid enters chamber 52 of device 50 through opening 54, which extends essentially the width of chamber 52 in the embodiment shown. The fluid flow is contracted because of the contraction of contracting portion 66 of wall 58. The fluid flow contracts relatively slowly through the area of chamber 52 defined by first sloped section 62 of wall 58. The contraction of fluid flow is increased through the area of chamber 52 defined by second sloped section 64 of wall 58. Fluid flows into section 67 where the flow is smoothed and relatively constant. Fluid flow expands in the area of chamber 52 adjacent expansion section 68 and fluid exits chamber 52 through opening 56.

Figure 3:
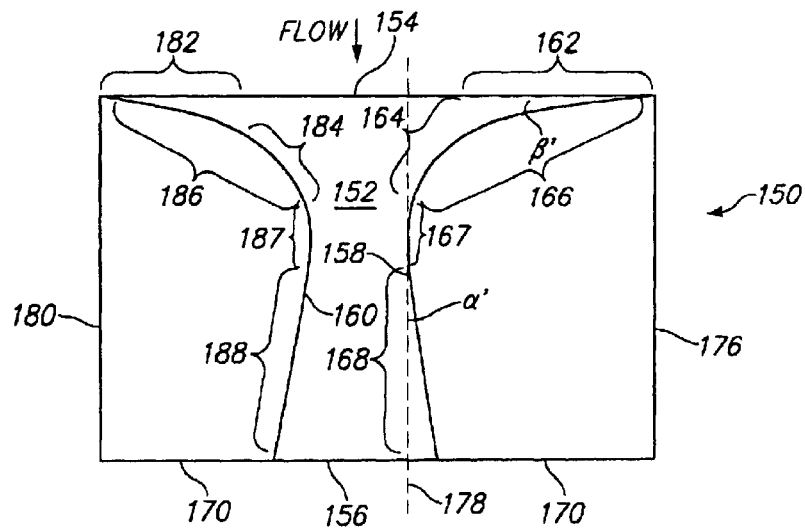
FIG. 3 is a schematic diagram depicting another embodiment of a device in accordance with the present invention.
Figure 4:
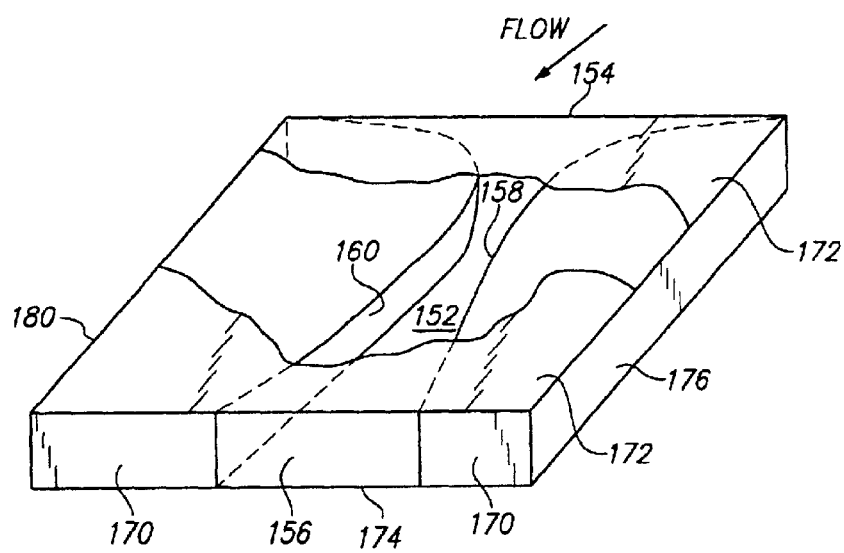
FIG. 4 is a top side, partial cut-away, elevational view of the device of FIG. 3 taken from the top side.

Another example of a device in accordance with the present invention is depicted in FIGS. 3 and 4, by way of illustration and not limitation. Device 150 comprises chamber 152 with opening 154 and opening 156. Device 150 also comprises opposing walls 158 and 160. At the beginning of opening 152, wall 158 forms first sloped portion 162, which has a relatively mild slope until second sloped portion 164. As can be seen, the slope of second sloped portion 164 is steep compared to first sloped portion 162. First sloped portion 162 and second sloped portion 164 form a contracting section 166 of side wall 158. The geometry of contracting section 166 provides for a contraction of the area of chamber 152 adjacent contracting portion 166. Wall 158 also comprises a section 167 having substantially constant cross-sectional area. Wall 158 also comprises expansion portion 168, which is characterized in that its geometry provides for an expansion of the area of chamber 152 adjacent expansion portion 168. In the embodiment shown in FIGS. 3 and 4, wall 160 also changes geometry. Device 150 also comprises partial side wall 170, top wall 172 and bottom wall 174. As can be seen from FIGS. 3 and 4, the exterior 176 of side wall 158 is substantially parallel to exterior 180 of side wall 160. The angle α' formed by contracting section 168 and imaginary line 178, which is parallel to exterior 176 of wall 158, is usually as set forth above for device 50 in FIG. 1. The angle β' formed by opening 154 and first sloped portion 162 is usually as set forth above for device 50 in FIG. 1.

As mentioned above, in the embodiment of FIGS. 3 and 4, side wall 160 also changes geometry. Accordingly, at the beginning of opening 152, wall 160 forms first sloped portion 182, which has a relatively mild slope until second sloped portion 184. As can be seen, the slope of second sloped portion 184 is steep compared to first sloped portion 182. First sloped portion 182 and second sloped portion 184 form a contracting section 186 of wall 160. The geometry of contracting section 186 provides for a contraction of the area of chamber 152 adjacent contracting portion 186. Wall 160 also comprises section 187 having a substantially constant cross-sectional area. Wall 160 also comprises expansion portion 188, which is characterized in that its geometry provides for an expansion of the area of chamber 152 adjacent expansion portion 188.

In operation, fluid enters chamber 152 of device 150 through opening 154, which extends essentially the width of chamber 152 in the embodiment shown. The fluid flow is contracted because of the contraction of contracting portion 166 of wall 158 and contracting portion 186 of wall 60. The fluid flow contracts relatively slowly through the area of chamber 152 defined by first sloped section 162 of wall 158 and first sloped section 182 of wall 160. The contraction of fluid flow is increased through the area of chamber 152 defined by second sloped section 164 of wall 158 and second sloped section 184 of wall 160. Fluid flows into section 167 and 187 where the flow is smoothed and relatively constant. Fluid flow expands in the area of chamber 152 adjacent expansion section 168 and expansion section 188 and fluid exits chamber 152 through opening 156.

The device of the present invention finds particular use in reaction chambers for carrying out chemical reactions. The present device may be incorporated into the design of an apparatus for conducting chemical reactions. The apparatus comprises a chamber comprising a pair of side walls, a gas inlet for introducing a gas into the interior of the chamber, and a gas outlet in a wall opposite the gas inlet. The gas outlet is a device as described above. Accordingly, at least one of the side walls of the chamber proximate the beginning of the gas outlet is designed to provide a contracting section and a diffusing section through the gas outlet. The apparatus also comprises various additional elements such as a mechanism for delivering reagents to the interior of the chamber for reaction to form chemical compounds, a mechanism for moving reaction substrates into and out of the chamber such as, e.g., through the gas outlet, and so forth.

Figure 5:
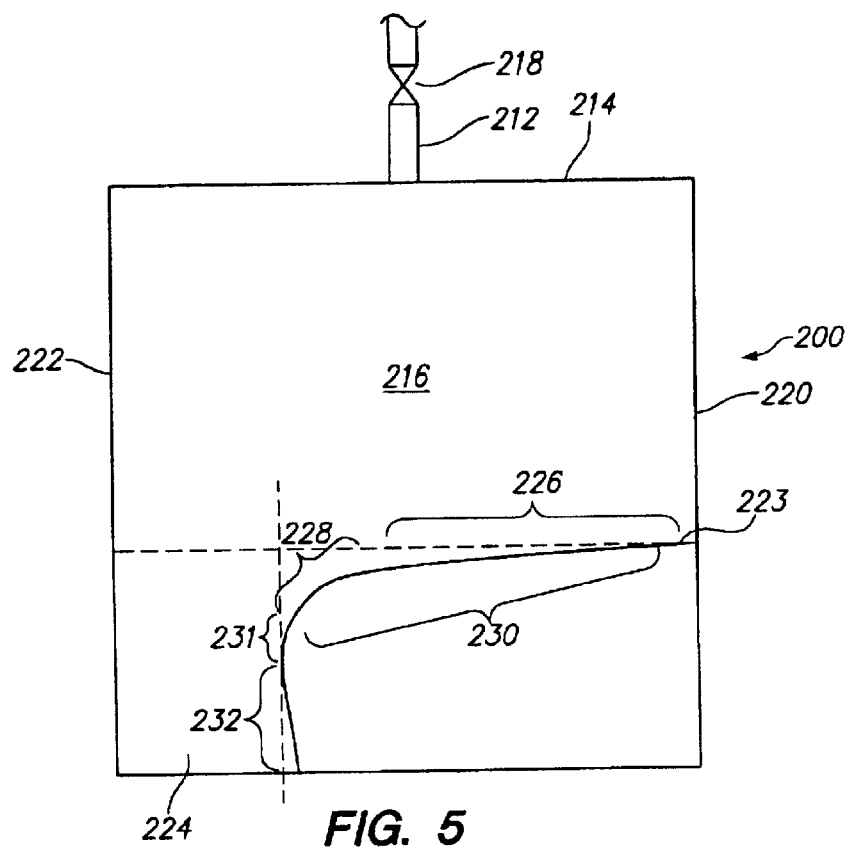
FIG. 5 is a schematic diagram depicting an embodiment of an apparatus employing a device in accordance with the present invention.
Figure 6:
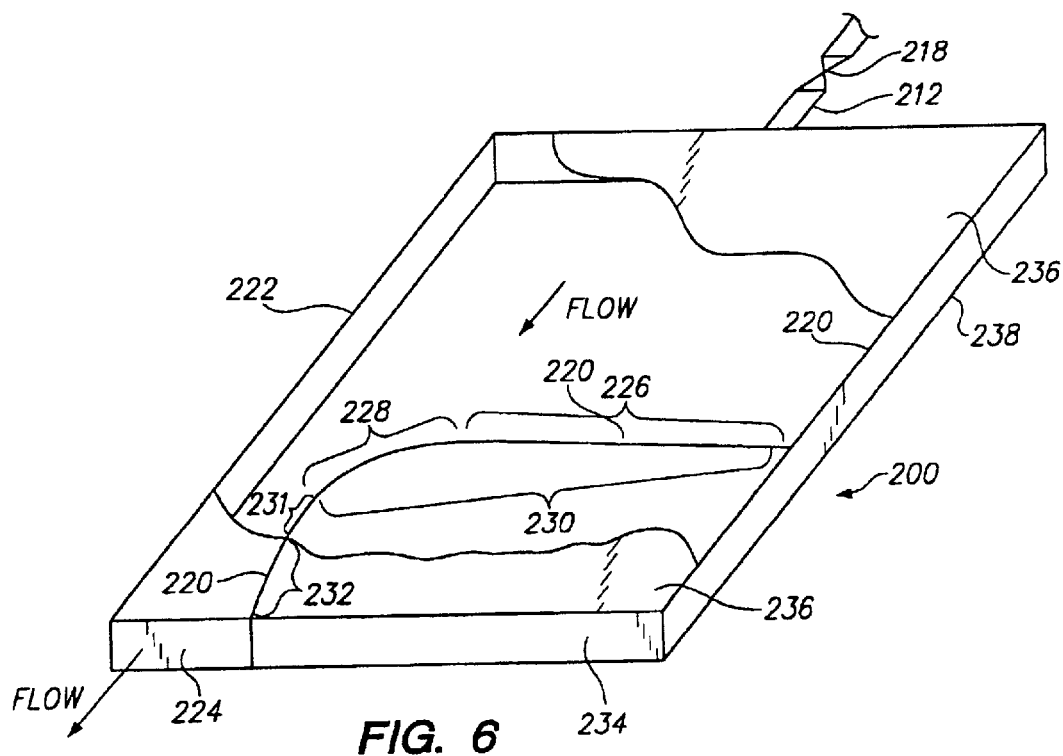
FIG. 6 is a top side, partial cut-away, elevational view of the device of FIG. 5 taken from the top side.

An example of a reaction chamber in accordance with this embodiment of the present invention is depicted in FIGS. 5 and 6, by way of illustration and not limitation. Apparatus 200 comprises gas inlet 212 in wall 214 of chamber 216. Gas inlet 212 is in fluid communication with a gas source (not shown) by means of valve 218. Device 200 also comprises opposing walls 220 and 222. At an area 223 at the beginning of gas outlet 224, wall 220 turns inward and forms first sloped portion 226, which has a relatively mild slope until second sloped portion 228. As can be seen, the slope of second sloped portion 228 is steep compared to first sloped portion 226. First sloped portion 226 and second sloped portion 228 form a contracting section 230 of wall 220. The geometry of contracting section 230 provides for a contraction of the area of chamber 216 adjacent contracting portion 230. Wall 220 further comprises section 231 that has a substantially constant cross-sectional area. Wall 220 also comprises expansion portion 232, which is characterized in that its geometry provides for an expansion of the area of chamber 216 adjacent expansion portion 232. In the embodiment shown in FIG. 5, wall 222 does not change geometry. Apparatus 200 also comprises partial side wall 234, top wall 236 and bottom wall 238.

The present invention provides a reaction chamber in which the internal atmospheric characteristics of, or the internal environmental conditions within, the reaction chamber are controlled. The atmospheric characteristics include, for example, humidity, ozone, dust, and the like, of the ambient atmosphere inside the reaction chamber. In the present apparatus, a gas such as a dry gas is introduced into the reaction chamber through a gas inlet. Usually, the gas is introduced under pressure and in such a manner as to provide careful distribution and controlled unidirectional flow of the gas. Controlling the exit of the gas from the chamber enhances effective unidirectional flow. The gas is allowed to exit through a gas outlet in a direction that is the same as the unidirectional flow. The gas outlet corresponds to a device as described above. As gas exits through the gas outlet, it is first contracted and then diffused. In this manner, the gas flow is kept unidirectional through the gas outlet and out of the chamber. The gas does not stagnate or re-circulate within the reaction chamber, which can cause increases in the level of humidity and other conditions in the reaction chamber. Furthermore, intake of ambient air outside the reaction chamber is minimized or eliminated.

It is usually the practice in the art, as explained above, to introduce a gas into the interior of reaction chambers to provide for a desired condition within the interior of the chamber such as, for example, a desired atmosphere, a desired level of humidity, and the like. The pressure of this gas may be about 20 to about 80 pounds per square inch (psi), more usually, about 40 to about 60 psi. Usually, the gas is introduced using one or more gas inlets in fluid communication with the chamber. Preferably, the gas is diffusively introduced into the chamber. Each gas inlet, in general, is a point source of the gas.

In a preferred approach, the mechanism for diffusively introducing gas into the chamber is one that permits gas under high pressure to be distributed from a point source into a spatially uniform pressure field that results in a spatially homogeneous flow field. The point source is typically a hollow, usually, tubular, preferably, circular in cross-section, although other cross-sectional shapes such as, e.g., square or rectangular, may be employed. The gas inlets are usually fabricated from nickel-plated aluminum, stainless steel, and the like. A tubular element usually has an inside diameter of about 0.06 to about 0.375 inches, usually, about 0.06 to about 0.3 inches, typically; about 0.19 inches. The point source is connected to a supply of gas.

It is important that the gas be inert to the components and conditions within the reaction chamber. The gas should be inert under the conditions of use in the present invention. Such gases include nitrogen, helium, noble gases, and the like, and mixtures thereof. Noble gases include, for example, argon, krypton, xenon, neon, and the like. For humidity control within the reaction chamber, the gas should have a water content that is less that about 20 ppm by volume, usually, less than about 5 ppm by volume, and desirably less than about 1 ppm by volume. The nature and composition of the gas is determined by the particular atmospheric characteristic to be controlled.

Various mechanisms for diffusively introducing gas into the apparatus may be employed. In one approach the mechanism comprises one or more gas inlets and a manifold comprising one or more compartments. Each of the compartments is in fluid communication with a respective gas inlet. In general, the number of compartments is based on the level of pressure of the gas, and so forth. Usually, the number of compartments in the manifold is about 3 to about 6, usually about 4 to about 5. The main function of the compartments of the manifold is to slow the flow of incoming gas and to convert the kinetic energy (dynamic pressure) of the gas to a higher static pressure with a flow at a lower velocity distributed more uniformly over the outlet of the manifold. Typically, the flow of incoming gas is slowed by a factor of about 10 to 100.

Each of the gas inlets usually comprises at least one valve, which provides a level of flow control in the above system. Suitable valves may be, for example, metering valves such as, e.g., Swagelok needle valves and the like. Other valves that may be employed include any valve with an easily adjustable flow rate at moderate pressures and so forth. With the use of valves, the flow rate to each compartment may be controlled. Accordingly, the flow field in the chamber can be tuned to overcome resistance due to obstacles in the chamber. The obstacles may be, for example, robotic manipulators, print head assemblies, and so forth. As one might appreciate, such obstacles represent interference in the flow field of the gas. With a suitable valving system, the pressure of the gas can be increased to account for the interference from the obstacles. The valving system may be controlled by a suitable controller to adjust the pressure of the gas as any obstacles are moved into and out of the chamber. Such controllers include, for example, proportional vales, and so forth. The controller acts in response to an appropriate sensor that senses the level of pressure flow within the chamber, the ambient environment within the chamber, and so forth. Suitable sensors include, for example, low pressure manometers, pressure transducers, and the like.

A flow visualization system may be employed to monitor the flow of gas within the apparatus and ensure that all of the gas that enters the apparatus is subsequently removed through an exit and is replaced with fresh gas. Suitable flow visualization systems include, for example, helium or hydrogen bubble generators or smoke wire visualization during development, and the like.

In one approach for diffusively introducing the gas into the chamber, diffuser elements may be used in the compartments of the manifold to provide for diffusion of the gas flow. In one embodiment the diffuser elements may take the form of raised surfaces within the compartments where the raised surfaces are tapered outwardly from the point source of the gas inlet to the area adjacent the outlet element. In this approach the diffuser elements within the compartments operate as a diffuser nozzle for diffusively introducing gas into the apparatus. The aforementioned arrangement of diffuser elements allows sufficient recovery of static pressure and uniform distribution of the flow of gas. The nature of the diffuser depends on a number of factors such as, for example, the pressure of the gas, and especially the diffuser's geometric properties and so forth. For use in the present invention, the diffuser elements generally have a rectangular cross section with a tapered angle of close to about 5 to about 12, usually, about 8 to about 10 degrees. Suitable other diffuser elements may be, for example, a series of screens, and the like. In this embodiment the dimensions of each of the compartments of the manifold are, by way of example and not limitation, 7 inches by 2.75 inches by 1.3 inches. The diffuser elements are tapered desirably, from a point source to the full width of the compartment at the point of the outlet element.

In some embodiments of the present apparatus, elements are included to achieve flow homogenization and flow straightening. In one approach an outlet element is in fluid communication with the mechanism for diffusively introducing gas into the apparatus. The outlet element comprises a plurality of openings therein. The pressure differential behind the outlet element forces a series of small jets out of the plurality of openings. This results in further homogenization of the flow field of gas because the pressure drop across the outlet element depends on the driving pressure in the manifold. The greater the driving pressure is, the greater will be the pressure drop. As mentioned above, the pressure of the gas is usually recovered to near atmospheric in the diffuser. The pressure drop across the outlet element is usually much less than 1 psi.

The outlet element usually comprises about 5 to about 200 openings per square inch, more usually, about 10 to about 50 openings per square inch. The openings may be considered to be perforations in the outlet element (for relatively thin outlet elements) or bores through the outlet element (for relatively thick outlet elements). The dimensions of the outlet element are sufficient to cover much of a single wall of the reaction chamber. The thickness of the outlet element is primarily dependent on whether the outlet element functions also as a flow straightener. When the outlet element functions as a flow straightener, the outlet element is relatively thick, namely, about 0.25 to about 2 inches thick, usually, about 1 to about 1.5 inches thick, more usually, about 0.8 to about 1.2 inches thick. When the outlet element is employed in conjunction with a flow-straightening element, the outlet element is relatively thin, namely, about 0.02 to about 0.2 inches thick, usually, about 0.04 to about 0.125 inches thick, more usually, about 0.05 to about 0.07 inches thick. In general, the dimensions of the openings are dependent on the available prefabricated materials having the desired number of openings. In general, the dimensions of the openings are dependent on the balance between the diffusion quality needed and the change in pressure available. The dimensions of the openings are about 0.03 to about 0.25 inches in diameter, usually about 0.05 to about 0.125 inches in diameter.

The outlet element is fabricated from a material that does not absorb water to any significant extent. By this is meant that the material does not absorb enough water that can later be liberated from the surface and interfere with the reactions that are to be carried out in a reaction chamber comprising the present apparatus. The absorbance tolerance for the material depends, therefore, on the nature of the reaction, production time requirements that may be impacted by an extended drydown, flowrate through the element, which would dilute the released humidity, and so forth. Accordingly, the material should not appreciably absorb water or outgas any potential contaminants such as plasticizers or chemicals in adhesives. Suitable materials for the outlet element include, by way of example and not limitation, include stainless steel, e.g., electropolished stainless steel, a material coated with a hydrophobic surface, nickel plated aluminum, and so forth. The outlet element may be fabricated by techniques such as, for example, creating the features with conventional or electrical discharge machining, forming, punching, assembling or agglomerating small pieces by sintering, welding or brazing, using CNC machine tools, electropolishing or electroplating of parts, and the like, which are well known in the art.

As mentioned above, in one embodiment a flow-straightening element may be employed in fluid communication with the outlet element. The flow-straightening element provides for straightening of the direction of the flow and ameliorates any large-scale aspects surviving in the flow. Such large-scale aspects include large vortices generated by incoming flow in the rectangular manifolds or by separation of the fluid boundary layer from the tapered diffuser elements, and the like. The flow-straightening element comprises a plurality of cavities within the structure of the element. The percentage of open area within the flow-straightening element due to the presence of cavities is about 65 to about 95%, usually, about 90 to about 95%. In one approach the flow-straightening element is a honeycomb element comprising a plurality of honeycomb features. Typically, the number of such cavities or features is sufficient to achieve the percentage of open area indicated above. Usually, the ratio of the length of the honeycomb element to the honeycomb features is at least about 7 to 1, at least about 8 to 1, at least about 10 to 1. The flow-straightening element is generally fabricated from a material that does not absorb water to any significant extent. Such materials are set forth above.

The flow-straightening element and the outlet element are usually separated by a space. The thickness of the space is dependent on a number of factors such as, for example, the hole size in the diffuser element, the size of the flow straightener cell, flowrate and so forth. Usually, the space is about 1 to about 50 mm thick, more usually, about 2 to about 10 mm thick. The flow-straightening element and the outlet element may be mounted in the interior of the chamber in a number of ways to achieve the appropriate space therebetween. Suitable mounting means include brackets, indentations in the wall of the chamber, clamping between chamber components, and so forth.

As mentioned above, the chamber comprises a gas outlet through which gas exits the chamber. Usually, the gas outlet is in a wall of the chamber opposite the flow-straightening element. In one embodiment the gas outlet comprises a door in a wall of the chamber for ingress and egress of a device such as, for example, a mechanism for introducing a support into the chamber, a device for dispensing reagents such as, e.g., a print head mechanism, and the like. The dimensions of the door are sufficient to permit ingress and egress of a device as mentioned above. Accordingly, the dimensions of the door are dependent on, and are governed by, the dimensions of the particular device. The door is provided with a suitable pivoting mechanism to allow the door to be moved for ingress or egress of a device.

Besides the wall opposite the outlet element that comprises a gas outlet, other walls of the chamber may comprise openings, which may be employed for ingress and egress of devices into and out of the chamber. For example, a mechanism for introducing a support into the interior of the chamber may enter the chamber through an opening in a bottom wall of the chamber. The opening may take the form of a membrane that comprises an opening such as a slit and the like. The membrane should have sufficient elasticity and form to permit introduction of a device into the chamber in a manner such that a seal is formed around the portion of the device that lies at the opening. The seal should be sufficient to minimize or exclude gas flowing though the chamber from exiting the chamber at the opening. The dimensions of the openings in the walls of the apparatus for insertion of various devices are dependent on the dimensions of the devices. In general, the opening in the wall should be sufficiently large enough to permit the device to be inserted into and removed from the chamber without interference with the sides of the opening. The openings should be no larger than necessary to permit the insertion and removal of the various devices.

Some of the mechanisms involved in the reactions to be conducted inside the reaction chamber may be mounted in a wall of the above apparatus. For example, a device for dispensing reagents within the chamber of the apparatus may be mounted in wall of the apparatus. Typically, only a portion of such device is mounted in the wall in communication with the interior of the chamber. Such devices include devices for dispensing reagents, and so forth.

The chamber cross-section is typically rectangular although other shapes may be employed depending on the nature of the operation to be performed in the interior of the chamber. For preparing supports having a plurality of biopolymer features thereon, the chamber cross-section is usually rectangular. The size of the chamber is dependent on the size of the devices such as, for example, printing heads, support holding mechanisms, cameras, and so forth, that are to be in the interior of the chamber during the steps involved in the synthesis of the biopolymer supports. In general, for synthesis of biopolymers on the surface of a support, the dimensions of the chamber should be sufficiently large enough so that the chamber can accommodate the support, the dispensing device or at least a portion thereof, as well as any elements necessary for the synthesis. The above factors govern the dimensions of the chamber for this purpose.

Typically, an apparatus for synthesis of biopolymer features has vertical symmetry to avoid any three-dimensional and/or re-circulating flow and to maintain a substantially steady and uniform flow, i.e., a controlled flow. Maintaining a controlled flow of gas within the chamber ensures that the boundary layer, i.e., the region of vortical flow near the surface where viscous effects are important, along the chamber walls remains attached to the surface as long as possible. By the term "substantially uniform flow" or "substantially controlled flow" is meant that the flow is controlled or uniform to the extent that little or no backflow occurs. In other words, the flow is controlled to the extent necessary to avoid entrainment of air outside the chamber. In one embodiment, the flow is substantially unidirectional such that the amount of recirculating flow is minimized or eliminated. It should be noted that laminar, turbulent or fully developed flow (referring to the boundary layer conditions) may be used to establish an overall flow regime in the chamber. One consideration is that the flow may not be totally predictable in detail due to factors such as interference from devices inside the chamber. Furthermore, the streamlines of the clean flow issuing from a flow straightener or diffuser may not be very straight at the exit. The flow may be moving at a velocity, even recirculating with small enough amplitude, low enough frequency and/or energy, with respect to the size of and conditions at the exit so as not to entrain atmospheric air. The chamber works because the overall flow regime acts to usher flow predictably (at the "macro" level) out the exit, i.e., with minimal or no backflow or recirculation of atmospheric air into the chamber.

The walls of the chamber may be fabricated from materials such as, for example, plastics, glass, silicon dioxide, metals, lightweight composites, and so forth. It is within the purview of the invention that the walls are not fabricated from the same material. For some uses such as, for example, chambers for performing synthesis of biopolymers on supports, the material for fabrication of at least one wall is transparent such as, e.g., glass, transparent plastics, silicon dioxide, quartz, and the like. Many transparent plastic materials are hygroscopic and may allow moisture to penetrate the walls of the chamber by material diffusion. Such materials should be avoided if possible.

The edges and joints of the chamber walls are areas that are susceptible to entraining moisture from the high-humidity environment outside the chamber. The right angle formed by these joints may produce resident vortices near the joints. The joint must have an airtight seal. If the joint is not sealed adequately, any small gap between the abutted elements may fill with near stagnant gas. Moisture may diffuse into the stagnant gas in this gap because the velocities of the gas in the gap are very small and the humidity concentration gradients are very high across this region. To reduce the possibility of the above, angles in the interior of the chamber may be beveled. The material used to create the bevel can then be used as a seal. The angles of particular concern are those at the edges and joints of the interior of the chamber. In general, the angles are beveled to the extent necessary to substantially reduce or eliminate circulatory flow induced by stream-wise, resident vortices created in sharp corners, which results in stagnation of gas at or near these joints. Ideally, the angles are beveled at about 45 degrees or radiused although other angles may be employed.

The perimeter walls of the apparatus are usually constructed from a suitable material that gives structural strength to the apparatus so that various moving parts may be employed in conjunction with the apparatus. In addition, the structural strength must be sufficient to accommodate the gas pressures employed. Such materials include, for example, metal, plastic, glass, quartz, lightweight composites, and the like.

Figure 7:
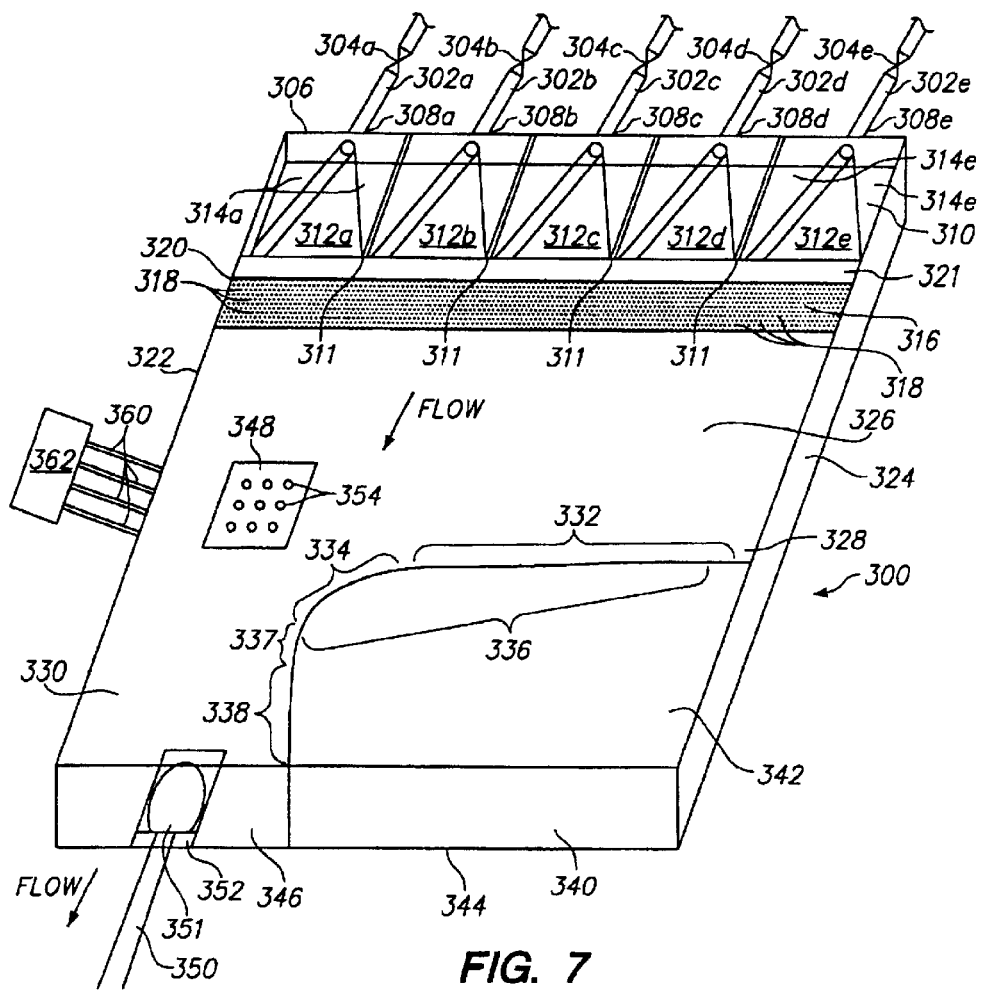
FIG. 7 is a top elevational view of an apparatus in accordance with the present invention for conducting chemical reactions.

An example of an apparatus in accordance with the aforementioned embodiment of the present invention is represented in FIG. 7. Apparatus 300 is depicted and comprises five gas inlets 302a–302e, each of which is in fluid communication with a respective valve 304a–304e. Each of the gas inlets is disposed in wall 306 of apparatus 300 and is attached at inlet points 308a–308e, respectively. Wall 306 is one wall of manifold 310, which comprises five compartments 312a–312e, each corresponding to a respective gas inlet 302a–302e. Opposite wall 306 is outlet element 316. Each compartment of manifold 310 comprises diffuser elements 314, namely, 314a–314e. As can be seen, each diffuser element is tapered from a respective gas inlet point to the outlet element adjacent the compartment where the tapered portion at the outlet element spans the width of the compartment of the manifold. In this way maximum diffusion of the gas entering the compartment is achieved. This combination of diffuser elements within the compartment of the manifold may be viewed as a diffuser nozzle. The compartments are separated within manifold 310 by means of walls 311.

In the embodiment of FIG. 7, outlet element 316 comprises a plurality of openings 318 therethrough. For the embodiment of FIG. 7, outlet element 316 also provides for flow-straightening of the gas. Accordingly, the thickness of outlet element 316 is significantly greater than the thickness of outlet element where a separate flow-straightening element is employed. Outlet element 316 is secured to the base of walls 311 of manifold 310 by appropriate fasteners such as, for example, screws, weld joints, and the like. Furthermore, outlet element 316 is secured in indentations 320 and 321 in walls 322 and 324, respectively, of apparatus 300. As might be understood from the above description, outlet element 316 is affixed in a sealed manner in apparatus 300 such that gas passes into chamber 326 only through openings 318 in outlet element 316.

Apparatus 300 also comprises a device as described above as a gas outlet in apparatus 300. At an area 328 at the beginning of gas outlet 330, wall 324 turns inward and forms first sloped portion 332, which has a relatively mild slope until second sloped portion 334. As can be seen, the slope of second sloped portion 334 is steep compared to first sloped portion 332. First sloped portion 332 and second sloped portion 334 form a contracting section 336 of wall 324. The geometry of contracting section 336 provides for a contraction of the area of chamber 326 adjacent contracting portion 336. Wall 324 further comprises section 337, which has substantially constant cross-sectional area. Wall 324 also comprises expansion portion 338, which is characterized in that its geometry provides for an expansion of the area of chamber 326 adjacent expansion portion 338. In the embodiment shown in FIG. 7, wall 322 does not change geometry. Apparatus 300 also comprises opening 346 at the end of gas outlet 330, partial side wall 340, top wall 342 and bottom wall 344.

As mentioned above, outlet opening 346 of gas outlet 330 may serve as an access for a mechanism 350 for introducing a support 352 into the interior of chamber 326. Bottom wall 344 may comprise a portion 348 of a dispensing device that protrudes into the interior of chamber 326. Portion 348 of a dispensing device comprises a plurality of dispensing nozzles 354. The dispensing device is seated in bottom wall 344 so that gas does not escape from chamber 326 through the area surrounding the dispensing device.

In operation of apparatus 300, gas is introduced into gas lines 302a–302e by operation of corresponding valves 304a–304e. Gas enters each of compartments 312a–312e and is diffused from point source 308a–308e by diffuser elements 314a–314e. The diffused gas enters outlet element 316. Gas flow through openings 318 of outlet element 316 results in flow homogenization and flow-straightening. Gas exiting outlet element 316 then flows through chamber 326 in a direction that is substantially perpendicular to wall 322 of apparatus 200.

Gas exits through gas outlet 330 and, as explained above, gas does not stagnate or re-circulate within chamber 126. At the beginning of gas outlet 330, gas flow is contracted because of the contraction of contracting portion 336 of wall 324. The gas flow contracts relatively slowly through the area of gas outlet 330 defined by first sloped section 332 of wall 324. The contraction of fluid flow is increased through the area of gas outlet 330 defined by second sloped section 334 of wall 324. Fluid flow expands in the area of gas outlet 330 adjacent expansion section 338 through opening 346. As a result of the geometry of gas outlet 330, intake of ambient air into opening 346 is minimized or avoided.

The present invention provides for additional advantages over an embodiment where a door might be employed at outlet opening 346. Pressure transients caused by the actuating of a door are substantially or fully eliminated. Such pressure fluctuations readily initiate three dimensionality in the flow causing recirculation and subsequent entrainment of moisture into the interior of the chamber. Reducing these pressure transients allows maintenance of a steady unidirectional flow through the gas outlet as mechanism 350 moves into and out of the chamber.

The present devices and methods may be employed in the synthesis of a plurality of chemical compounds on supports. Usually, the chemical compounds are those that are synthesized in a series of steps such as, for example, the addition of building blocks, which are chemical components of the chemical compound. Examples of such building blocks are those found in the synthesis of polymers. The invention has particular application to the in situ synthesis of biopolymers such as polynucleotides, for example, oligonucleotides. Such methods usually require a step of dispensing reagents to discrete sites on the surface of a support. The present apparatus are well-suited for performing such steps, which usually require a controlled environment such as a low humidity environment.

As mentioned above, the chemical compounds are those that are synthesized in a series of steps, which usually involve linking together building blocks that form the chemical compound. The invention has particular application to the synthesis of oligomers or polymers. The oligomer or polymer is a chemical entity that contains a plurality of monomers. It is generally accepted that the term "oligomers" is used to refer to a species of polymers. The terms "oligomer" and "polymer" may be used interchangeably herein. Polymers usually comprise at least two monomers. Oligomers generally comprise about 6 to about 20,000 monomers, preferably, about 10 to about 10,000, more preferably about 15 to about 4,000 monomers. Examples of polymers include polydeoxyribonucleotides, polyribonucleotides, other polynucleotides that are C-glycosides of a purine or pyrimidine base, or other modified polynucleotides, polypeptides, polysaccharides, and other chemical entities that contain repeating units of like chemical structure. Exemplary of oligomers are oligonucleotides and peptides.

A monomer is a chemical entity that can be covalently linked to one or more other such entities to form an oligomer or polymer. Examples of monomers include nucleotides, amino acids, saccharides, peptoids, and the like and subunits comprising nucleotides, amino acids, saccharides, peptoids and the like. The subunits may comprise all of the same component such as, for example, all of the same nucleotide or amino acid, or the subunit may comprise different components such as, for example, different nucleotides or different amino acids. The subunits may comprise about 2 to about 2000, or about 5 to about 200, monomer units. In general, the monomers have first and second sites (e.g., C-termini and N-termini, or 5' and 3' sites) suitable for binding of other like monomers by means of standard chemical reactions (e.g., condensation, nucleophilic displacement of a leaving group, or the like), and a diverse element that distinguishes a particular monomer from a different monomer of the same type (e.g., an amino acid side chain, a nucleotide base, etc.). The initial substrate-bound, or support-bound, monomer is generally used as a building block in a multi-step synthesis procedure to form a complete ligand, such as in the synthesis of oligonucleotides, oligopeptides, oligosaccharides, etc. and the like.

A biomonomer references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution).

A biopolymer is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

Polynucleotides are compounds or compositions that are polymeric nucleotides or nucleic acid polymers. The polynucleotide may be a natural compound or a synthetic compound. Polynucleotides include oligonucleotides and are comprised of natural nucleotides such as ribonucleotides and deoxyribonucleotides and their derivatives although unnatural nucleotide mimetics such as 2'-modified nucleosides, peptide nucleic acids and oligomeric nucleoside phosphonates are also used. The polynucleotide can have from about 2 to 5,000,000 or more nucleotides. Usually, the oligonucleotides are at least about 2 nucleotides, usually, about 5 to about 100 nucleotides, more usually, about 10 to about 50 nucleotides, and may be about 15 to about 30 nucleotides, in length. Polynucleotides include single or multiple stranded configurations, where one or more of the strands may or may not be completely aligned with another.

A nucleotide refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides.

The support or substrate to which a plurality of chemical compounds is attached is usually a porous or non-porous water insoluble material. The support can have any one of a number of shapes, such as strip, plate, disk, rod, particle such as a bead, and the like. The support can be hydrophilic or capable of being rendered hydrophilic or it may be hydrophobic. The support is usually glass such as flat glass whose surface has been chemically activated for binding thereto or synthesis thereon, glass available as Bioglass and the like. However, the support may be made from materials such as inorganic powders, e.g., silica, magnesium sulfate, and alumina; natural polymeric materials, particularly cellulosic materials and materials derived from cellulose, such as fiber containing papers, e.g., filter paper, chromatographic paper, etc.; synthetic or modified naturally occurring polymers, such as nitrocellulose, cellulose acetate, poly (vinyl chloride), polyacrylamide, cross linked dextran, agarose, polyacrylate, polyethylene, polypropylene, poly(4-methylbutene), polystyrene, polymethacrylate, poly (ethylene terephthalate), nylon, poly(vinyl butyrate), etc.; either used by themselves or in conjunction with other materials; ceramics, metals, and the like. Preferably, for packaged arrays the support is a non-porous material such as glass, plastic, metal or the like.

The surface of a support is normally treated to create a primed or functionalized surface, that is, a surface that is able to support the synthetic steps involved in the production of the chemical compound. Functionalization relates to modification of the surface of a support to provide a plurality of functional groups on the support surface. By the term "functionalized surface" is meant a support surface that has been modified so that a plurality of functional groups are present thereon usually at discrete sites on the surface. The manner of treatment is dependent on the nature of the chemical compound to be synthesized and on the nature of the support surface. In one approach a reactive hydrophilic site or reactive hydrophilic group is introduced onto the surface of the support. Such hydrophilic moieties can be used as the starting point in a synthetic organic process.

In one embodiment, the surface of the support, such as a glass support, is siliceous, i.e., comprises silicon oxide groups, either present in the natural state, e.g., glass, silica, silicon with an oxide layer, etc., or introduced by techniques well known in the art. One technique for introducing siloxyl groups onto the surface involves reactive hydrophilic moieties on the surface. These moieties are typically epoxide groups, carboxyl groups, thiol groups, and/or substituted or unsubstituted amino groups as well as a functionality that may be used to introduce such a group such as, for example, an olefin that may be converted to a hydroxyl group by means well known in the art. One approach is disclosed in U.S. Pat. No. 5,474,796 (Brennan), the relevant portions of which are incorporated herein by reference. A siliceous surface may be used to form silyl linkages, i.e., linkages that involve silicon atoms. Usually, the silyl linkage involves a silicon-oxygen bond, a silicon-halogen bond, a silicon-nitrogen bond, or a silicon-carbon bond.

Another method for attachment is described in U.S. Pat. No. 6,219,674 (Fulcrand, et al.). A surface is employed that comprises a linking group consisting of a first portion comprising a hydrocarbon chain, optionally substituted, and a second portion comprising an alkylene oxide or an alkylene imine wherein the alkylene is optionally substituted. One end of the first portion is attached to the surface and one end of the second portion is attached to the other end of the first portion chain by means of an amine or an oxy functionality. The second portion terminates in an amine or a hydroxy functionality. The surface is reacted with the substance to be immobilized under conditions for attachment of the substance to the surface by means of the linking group.

Another method for attachment is described in U.S. Pat. No. 6,258,454 (Lefkowitz, et al.). A solid support having hydrophilic moieties on its surface is treated with a derivatizing composition containing a mixture of silanes. A first silane provides the desired reduction in surface energy, while the second silane enables functionalization with molecular moieties of interest, such as small molecules, initial monomers to be used in the solid phase synthesis of oligomers, or intact oligomers. Molecular moieties of interest may be attached through cleavable sites.

A procedure for the derivatization of a metal oxide surface uses an aminoalkyl silane derivative, e.g., trialkoxy 3-aminopropylsilane such as aminopropyltriethoxy silane (APS), 4-aminobutyltrimethoxysilane, 4-aminobutyltriethoxysilane, 2-aminoethyltriethoxysilane, and the like. APS reacts readily with the oxide and/or siloxyl groups on metal and silicon surfaces. APS provides primary amine groups that may be used to carry out the present methods. Such a derivatization procedure is described in EP 0 173 356 B1, the relevant portions of which are incorporated herein by reference. Other methods for treating the surface of a support will be suggested to those skilled in the art in view of the teaching herein.

The devices and methods of the present invention are particularly useful in the synthesis of arrays of biopolymers. A biopolymer is a polymer of one or more types of repeating units relating to biology. Biopolymers are typically found in biological systems (although they may be made synthetically) and particularly include peptides or polynucleotides, as well as such compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

An array includes any one-, two- or three-dimensional arrangement of addressable regions bearing a particular biopolymer such as polynucleotides, associated with that region. An array is addressable in that it has multiple regions of different moieties, for example, different polynucleotide sequences, such that a region or feature or spot of the array at a particular predetermined location or address on the array can detect a particular target molecule or class of target molecules although a feature may incidentally detect non-target molecules of that feature.

The present devices and methods may be used in the synthesis of polypeptides. The synthesis of polypeptides involves the sequential addition of amino acids to a growing peptide chain. This approach comprises attaching a first amino acid to the functionalized surface of the support. In one approach the synthesis involves sequential addition of carboxyl-protected amino acids to a growing peptide chain with each additional amino acid in the sequence similarly protected and coupled to the terminal amino acid of the oligopeptide under conditions suitable for forming an amide linkage. Such conditions are well known to the skilled artisan. See, for example, Merrifield, B. (1986), Solid Phase Synthesis, *Sciences* 232, 341–347. After polypeptide synthesis is complete, acid is used to remove the remaining terminal protecting groups.

The present invention has particular application to the synthesis of arrays of chemical compounds on a surface of a support. Typically, methods and apparatus of the present invention generate or use an array assembly that may include a support carrying one or more arrays disposed along a surface of the support and separated by inter-array areas. Normally, the surface of the support opposite the surface with the arrays does not carry any arrays. The arrays can be designed for testing against any type of sample, whether a trial sample, a reference sample, a combination of the foregoing, or a known mixture of components such as polynucleotides, proteins, polysaccharides and the like (in which case the arrays may be composed of features carrying unknown sequences to be evaluated). The surface of the support may carry at least one, two, four, or at least ten, arrays. Depending upon intended use, any or all of the arrays may be the same or different from one another and each may contain multiple spots or features of chemical compounds such as, e.g., biopolymers in the form of polynucleotides or other biopolymer. A typical array may contain more than ten, more than one hundred, more than one thousand or ten thousand features, or even more than one hundred thousand features, in an area of less than 20 $cm^2$ or even less than 10 $cm^2$. For example, features may have widths (that is, diameter, for a round spot) in the range from a 10 $\mu$m to 1.0 cm. In other embodiments each feature may have a width in the range from a 10 $\mu$m to 1.0 mm, usually 5.0 $\mu$m to 500 $\mu$m, and more usually 10 $\mu$m to 200 $\mu$m. Non-round features may have area ranges equivalent to that of circular features with the foregoing width (diameter) ranges.

Each feature, or element, within the molecular array is defined to be a small, regularly shaped region of the surface of the substrate. The features are arranged in a predetermined manner. Each feature of an array usually carries a predetermined chemical compound or mixtures thereof. Each feature within the molecular array may contain a different molecular species, and the molecular species within a given feature may differ from the molecular species within the remaining features of the molecular array. Some or all of the features may be of different compositions. Each array may contain multiple spots or features and each array may be separated by spaces or areas. It will also be appreciated that there need not be any space separating arrays from one another. Interarray areas and interfeature areas are usually present but are not essential. These areas do not carry any chemical compound such as polynucleotide (or other biopolymer of a type of which the features are composed). Interarray areas and interfeature areas typically will be present where arrays are formed by the conventional in situ process or by deposition of previously obtained moieties, as described above, by depositing for each feature at least one droplet of reagent such as from a pulse jet (for example, an inkjet type head) but may not be present when, for example, photolithographic array fabrication processes are used. It will be appreciated though, that the interarray areas and interfeature areas, when present, could be of various sizes and configurations.

The devices and methods of the present invention are particularly useful in the synthesis of oligonucleotide arrays for determinations of polynucleotides. As explained briefly above, in the field of bioscience, arrays of oligonucleotide probes, fabricated or deposited on a surface of a support, are used to identify DNA sequences in cell matter. The arrays generally involve a surface containing a mosaic of different oligonucleotides or sample nucleic acid sequences or polynucleotides that are individually localized to discrete, known areas of the surface. In one approach, multiple identical arrays across a complete front surface of a single substrate or support are used.

Biopolymer arrays can be fabricated by depositing previously obtained biopolymers (such as from synthesis or natural sources) onto a substrate, or by in situ synthesis methods. Methods of depositing obtained biopolymers include dispensing droplets to a substrate from dispensers such as pin or capillaries (such as described in U.S. Pat. No. 5,807,522) or such as pulse jets (such as a piezoelectric inkjet head, as described in PCT publications WO 95/25116 and WO 98/41531, and elsewhere). For in situ fabrication methods, multiple different reagent droplets are deposited from drop dispensers at a given target location in order to form the final feature (hence a probe of the feature is synthesized on the array substrate). The in situ fabrication methods include those described in U.S. Pat. No. 5,449,754 for synthesizing peptide arrays, and described in WO 98/41531 and the references cited therein for polynucleotide arrays.

The fluid dispensing device normally includes a reagent source or manifold as well as reagent lines that connect the source to fluid dispensing nozzles and the like. Any system may be employed that dispenses fluids such as water, aqueous media, organic solvents and the like. The fluid dispensing device may comprises a pump for moving fluid and may also comprise a valve assembly and a manifold as well as a means for delivering predetermined quantities of fluid to the surface of a support. The fluids may be dispensed by any of the known techniques such as those mentioned above. Any standard pumping technique for pumping fluids may be employed in the dispensing device. For example, pumping may be by means of a peristaltic pump, a pressurized fluid bed, a positive displacement pump, e.g., a syringe pump, and the like.

The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence is as follows: (a) coupling a selected nucleoside through a phosphite linkage to a functionalized support in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized support (in the first cycle) or deprotected coupled nucleoside (in subsequent cycles) provides a substrate bound moiety with a linking group for forming the phosphite linkage with a next nucleoside to be coupled in step (a). A number of reagents involved in the above synthetic steps such as, for example, phosphoramidite reagents, are sensitive to moisture and anhydrous conditions and solvents are employed. Final deprotection of nucleoside bases can be accomplished using alkaline conditions such as ammonium hydroxide, in a known manner.

The foregoing chemistry of the synthesis of polynucleotides is described in detail, for example, in Caruthers, *Science* 230: 281–285, 1985; Itakura, et al., *Ann. Rev. Biochem.* 53: 323–356; Hunkapillar, et al., *Nature* 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. Nos. 4,458,066, 4,500,707, 5,153,319, and 5,869,643, EP 0294196, and elsewhere.

As mentioned above, various ways may be employed to introduce the reagents for producing an array of polynucleotides on the surface of a support such as a glass support. Such methods are known in the art. One such method is discussed in U.S. Pat. No. 5,744,305 (Fodor, et al.) and involves solid phase chemistry, photolabile protecting groups and photolithography. Binary masking techniques are employed in one embodiment of the above. Arrays are fabricated in situ, adding one base pair at a time to a primer site. Photolithography is used to uncover sites, which are then exposed and reacted with one of the four base pair phosphoramidites. In photolithography the surface is first coated with a light-sensitive resist, exposed through a mask and the predetermined area is revealed by dissolving away the exposed or the unexposed resist and, subsequently, a surface layer. A separate mask is usually made for each predetermined area, which may involve one for each base pair in the length of the probe.

Another in situ method employs inkjet printing technology to dispense the appropriate phosphoramidite reagents and other reagents onto individual sites on a surface of a support. Oligonucleotides are synthesized on a surface of a substrate in situ using phosphoramidite chemistry. Solutions containing nucleotide monomers and other reagents as necessary such as an activator, e.g., tetrazole, are applied to the surface of a support by means of thermal ink-jet technology. Individual droplets of reagents are applied to reactive areas on the surface using, for example, a thermal ink-jet type nozzle. The surface of the support may have an alkyl bromide trichlorosilane coating to which is attached polyethylene glycol to provide terminal hydroxyl groups. These hydroxyl groups provide for linking to a terminal primary amine group on a monomeric reagent. Excess of non-reacted chemical on the surface is washed away in a subsequent step. For example, see U.S. Pat. No. 5,700,637 and PCT WO 95/25116 and PCT application WO 89/10977.

Another approach for fabricating an array of biopolymers on a substrate using a biopolymer or biomonomer fluid and using a fluid dispensing head is described in U.S. Pat. No. 6,242,266 (Schleifer, et al.). The head has at least one jet that can dispense droplets onto a surface of a support. The jet includes a chamber with an orifice and an ejector, which, when activated, causes a droplet to be ejected from the orifice. Multiple droplets of the biopolymer or biomonomer fluid are dispensed from the head orifice so as to form an array of droplets on the surface of the substrate.

In another embodiment (U.S. Pat. No. 6,232,072) (Fisher) a method of, and apparatus for, fabricating a biopolymer array is disclosed. Droplets of fluid carrying the biopolymer or biomonomer are deposited onto a front side of a transparent substrate. Light is directed through the substrate from the front side, back through a substrate back side and a first set of deposited droplets on the first side to an image sensor.

An example of another method for chemical array fabrication is described in U.S. Pat. No. 6,180,351 (Cattell). The method includes receiving from a remote station information on a layout of the array and an associated first identifier. A local identifier is generated corresponding to the first identifier and associated array. The local identifier is shorter in length than the corresponding first identifier. The addressable array is fabricated on the substrate in accordance with the received layout information.

Other methods for synthesizing arrays of oligonucleotides on a surface include those disclosed by Gamble, et al., WO97/44134; Gamble, et al., WO98/10858; Baldeschwieler, et al., WO95/25116; Brown, et al., U.S. Pat. No. 5,807,522; and the like.

In accordance with the present invention the step of dispensing reagents to the surface of a support may be carried out using an apparatus in accordance with the present invention. The primary application of the present apparatus is dispensing monomer addition reagents to discrete sites on the surface of a support. In addition, under certain circumstances other reactions may be carried out such as, for example, phosphoramidite monomer addition, modified phosphoramidite addition, other monomer additions, addition of a polymer chain to a surface for linking to monomers, and so forth. However, other steps that may be conducted using the present apparatus include by way of illustration and not limitation, washing of the surface of the support prior to or after a reaction, protection and deprotection of certain functionalities on the surface, oxidation or reduction of functionalities on the surface such as, e.g., oxidation of a phosphite group to a phosphate group, removal of protecting groups, blocking of sites to prevent reaction at such site, capping of sites that did not react with a phosphoramidite reagent, deblocking, and so forth. It should be noted that, while the discussion herein may be directed to the synthesis of biopolymers, this is by way of illustration and not limitation. The apparatus of the invention may be used for other synthetic reactions as will be suggested to those skilled in the art in view of the disclosure herein.

The reagents that may be dispensed include, for example, a chemical reagent that forms part of the chemical compound by addition thereto, wash fluids, oxidizing agents, reducing agents, blocking or protecting agents, unblocking or deprotecting agents, and so forth. Any reagent that is normally a solid reagent may be converted to a fluid reagent by dissolution in a suitable solvent, which may be a protic solvent or an aprotic solvent. The solvent may be an organic solvent such as, by way of illustration and not limitation, oxygenated organic solvents of from 1 to about 6, more usually from 1 to about 4, carbon atoms, including alcohols such as methanol, ethanol, propanol, etc., ethers such as tetrahydrofuran, ethyl ether, propyl ether, etc., acetonitrile, dimethylformamide, dimethylsulfoxide, and the like. The solvent may be an aqueous medium that is solely water or may contain a buffer, or may contain from about 0.01 to about 80 or more volume percent of a cosolvent such as an organic solvent as mentioned above.

The dimensions of the support may vary depending on the nature of the support. For example, the support may be one on which a single array of chemical compounds is synthesized. In this regard the support is usually about 1.5 to about 5 inches in length and about 0.5 to about 3 inches in width. The support is usually about 0.1 to about 5 mm, more usually, about 0.5 to about 2 mm, in thickness. A standard size microscope slide is usually about 3 inches in length and 1 inch in width. Alternatively, multiple arrays of chemical compounds may be synthesized on the support, which is then diced, i.e., cut, into single array supports. In this alternative approach the support is usually about 5 to about 8 inches in length and about 5 to about 8 inches in width so that the support may be diced into multiple single array supports having the aforementioned dimensions. The thickness of the support is the same as that described above. In a specific embodiment by way of illustration and not limitation, a wafer that is 6 ⅝ inches by 6 inches is employed and diced into one inch by 3 inch slides.

The apparatus depicted in FIG. 7 may be used for manufacturing an array of biopolymers on a support. As explained above, device 348 for dispensing reagents is mounted in bottom wall 344 of apparatus 300 so that dispensing nozzles 354 protrude into the interior of chamber 326. The reagents are those needed for synthesizing an array of biopolymer features on support 352. The remainder of dispensing device 348, which includes reagent source lines 360 and reagent source manifold 362, are mounted outside of apparatus 300. Device 348 is mounted in wall 344 in a sealed manner so that gas does not escape from chamber 326 through the area around the opening in wall 344 in which dispensing nozzles 354 are mounted. A mechanism 350 for inserting a support 352 through opening 346 and into chamber 326 is in the form of a robot arm, to which support 352 is secured by means such as vacuum means and the like.

Mechanism 350 also comprises a movement stage that may comprise an x,y-stage and a theta stage (not shown) for moving support 352 into various positions relative to dispensing nozzles 354 so that reagents may be dispensed to different discrete sites on support 352. Gas is introduced into apparatus 300 through gas inlets 302a–302e, each of which is in fluid communication with a respective compartment 312a–312e of manifold 310 and with a respective gas valve 304a–304e. The gas is diffused in the compartments and undergoes homogenization and flow-straightening as it passes through outlet element 318 into chamber 326. The direction of flow of the gas is substantially perpendicular to wall 340 of apparatus 300. The gas exits chamber 326 through gas outlet 330. The functioning of the valves, robot arms, dispensing device, and so forth may be controlled by suitable controllers to carry out a predetermined sequence of events. The controllers may be under computer control to further automate the process and instructions may be introduced into the computer by means of suitable software programs. The controllers are also instructed as to the sequence of nucleotides that is to be employed to prepare the desired oligonucleotides on the surface of support 352. A unique sequence may be specified at each site on the support.

As indicated above, apparatus 300 comprises a mechanism 350 for moving support 352 into and out of chamber 326 through opening 346 and for positioning support 352 relative to device 348 for dispensing reagents. The mechanism usually comprises a holding element 351 for the support. In one embodiment of the invention the holding element for the support is a low drag body for modest Reynolds numbers. The characteristics of the holding element result in a minimization of the wake behind the holding element as it enters the opening of the gas outlet. These characteristics in conjunction with a suitable flow speed of gas through the gas outlet result in minimization of entrainment of air as the mechanism withdraws from the chamber. For this purpose gas flow speeds are about 0.25 to about 1 meter per second (m/s), usually, about 0.3 to about 0.5 m/s. The Reynolds numbers for the holding element are in the range of about 100 to about 10,000, typically less than about 3000.

Figure 8:
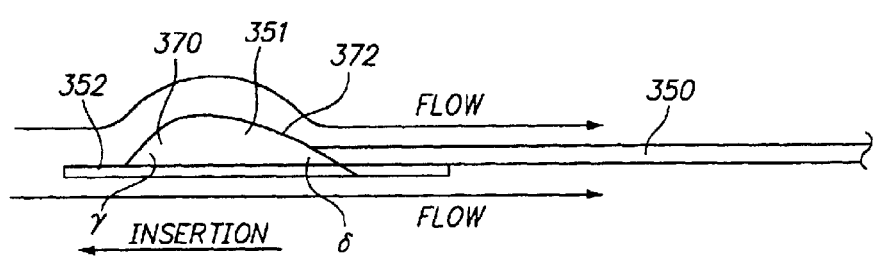
FIG. 8 is a schematic diagram of a support holding element in accordance with one aspect of the present invention.

A general shape for the low drag body for the holding element is depicted in FIG. 8, by way of illustration and not limitation. Referring to FIG. 8, holding element 351 is depicted attached to mechanism 350, which may be a robot arm. Support 352 is releasably secured to holding element 351 so that the support may be removed from holding element 351 when the synthesis of the biopolymers on the surface of support 352 is complete. There are two directions indicated in FIG. 8. One direction indicated is the direction in which the holding element is inserted into an apparatus in accordance with the invention. The other direction indicated is that of the gas flow exiting an apparatus as it passes over and under holding element 351 and support 352. Referring to FIG. 8, front portion 370 of holding element 351 is tapered. The angle □ formed by the front end of holding element 351 and the horizontal is about 45 to about 90 degrees. Rear portion 372 of holding element 351 is tapered in a direction opposite to the direction of taper of front portion 370. The angle γ formed by the rear end of holding element 351 and the horizontal is about 5 to about 30 degrees, usually, about 10 to about 20 degrees. In this way a low drag body feature for holding element 351 is achieved. The holding element may take the form of a vacuum fork and the like. The holding element may be fabricated from any material but, preferably, from a material that does not substantially adsorb or that does not substantially release, moisture from its surface. Such surface may be coated to achieve the above; suitable coatings include, for example, TEFLON®, and so forth.

The low drag body can be constructed from a wide variety of shapes roughly simulating a half airfoil. The most important physical characteristic is that the body surface is free from sharp edges and protrusions. The exact shape for each manipulator fairing is usually determined empirically to fit around each desired manipulator. The manipulator is a device that manipulates a support; examples include a vacuum chuck and so forth. The fairing is the aerodynamics shell constructed to fit around the manipulator to make it more aerodynamic. In one embodiment, the height of the fairing is about 1 to about 2 times, usually, about 1.3 to about 1.5 times the length.

In one embodiment of a method for synthesizing a plurality of biopolymers on a support in accordance with the present invention, the support is introduced into a reaction chamber, which has a positive and substantially uniform unidirectional flow of gas through the reaction chamber. The gas exits the reaction chamber through a gas outlet in the same unidirectional flow. Discrete sites on the surface of the support are activated for attachment of a biopolymer precursor. The support and a dispensing system for dispensing reagents for the synthesis of the biopolymers are brought into a dispensing position relative to the activated discrete sites on the surface. Reagents are dispensed to the discrete sites. The support and/or the dispensing system are removed from the relative dispensing position. Optionally, the above steps are repeated until the biopolymer is formed. The method has particular application to the in situ synthesis of an array of biopolymers on the surface of a support.

The aforementioned apparatus 300 may be employed in the automated manufacture of an array of oligonucleotides on the surface of support 352 consistent with the above-described method. Phosphoramidite synthetic methods may be employed in conjunction with the aforementioned apparatus 300 to provide a controlled environment within the interior of chamber 326. The surface of support 352 may be activated to provide for a first monomer in the synthesis chain already present on the surface of support 352. Support 352 is releasably secured to holding element 351. A controller first opens valves 304a–304e so that gas enters manifold 310 and flows though outlet element 316 into chamber 326 to create a controlled environment within the interior of chamber 326. A controller directs the movement of mechanism 350, which comprises a robotic arm, so that support 352 is moved into the interior of chamber 326 so that the activated surface of support 352 is in proper orientation with respect to dispensing nozzles 354. A controller directs the movement of mechanism 350 with respect to dispensing nozzles 354 for precise placement of spots of reagents at particular sites on support 352.

The reagents are delivered to the individual sites using the dispensing device 348 where the dispensing nozzles 354 are at a fixed location and the support is moved with the above stages. It is within the purview of the present invention to move the dispensing nozzles relative to the support. Since the surface of support 352 is activated with a first monomer in the synthesis and the first monomer usually comprises a protection group, the protection group must be removed prior to the addition of a second monomer. This exposes an activated moiety on the monomer, which reacts with the next phosphoramidite reagent that is delivered to the surface of support 352 by means of dispensing nozzles 354. The next dispensed phosphoramidite reagent reacts only at specific discrete sites on the surface of support 352.

During the synthesis, there are a number of instances where the surface of the support must be washed to remove unreacted or unwanted materials. Furthermore, deprotection agents are added to remove protection groups and oxidizing agents are added to oxidize certain groups such as phosphite groups to phosphate groups. These steps may be carried out using dispensing device 348 to dispense wash buffers or deprotection agents, as the case may be, to the surface of support 352. On the other hand, mechanism 350 is activated to remove support 352 from chamber 326 and move support 352 to a station for washing its surface or to a station for administering deprotection or other agents. Mechanism 350 then moves support 352 back through opening 346 into the interior of chamber 326. A controller again directs the movement of holding element 351 with respect to dispensing nozzles 354 for precise placement of spots of reagents at particular sites on support 352. The aforementioned steps are continued under the control of the various controllers until the desired oligonucleotides are synthesized in an array on support 352.

During the various steps in the synthesis of the oligonucleotides, the temperature of the reactions requires control to facilitate the reactions. Usually, the reactions require elevated temperatures in order for the reactions to occur. In one approach the temperature of the interior of the chamber may be controlled by controlling the temperature of the gas that is introduced into apparatus 300. In another approach, holding element 352 may be equipped with heating elements to provide for temperature control. In yet another approach, the temperature of the reagents that are dispensed through device 348 may be controlled as the reagents are dispensed to the surface of support 352.

The amount of the reagents employed in each synthetic step in the method of the present invention is dependent on the nature of the reagents, solubility of the reagents, reactivity of the reagents, availability of the reagents, purity of the reagents, and so forth. Such amounts should be readily apparent to those skilled in the art in view of the disclosure herein. Usually, stoichiometric amounts are employed, but excess of one reagent over the other may be used where circumstances dictate. Typically, the amounts of the reagents are those necessary to achieve the overall synthesis of the chemical compound in accordance with the present invention. The time period for conducting the present method is dependent upon the specific reaction and reagents being utilized and the chemical compound being synthesized.

The apparatus of the invention further comprise appropriate electrical and mechanical architecture and electrical connections, wiring and devices such as timers, clocks, and so forth for operating the various elements of the apparatus. Such architecture is familiar to those skilled in the art and will not be discussed in more detail herein.

As mentioned above, the apparatus functions and the methods in accordance with the present invention may be carried out under computer control, that is, with the aid of a computer. For example, an IBM® compatible personal computer (PC) may be utilized. The computer is driven by software specific to the methods described herein. A preferred computer hardware capable of assisting in the operation of the methods in accordance with the present invention involves a system with at least the following specifications:

Pentium® processor or better with a clock speed of at least 100 MHz, at least 32 megabytes of random access memory (RAM) and at least 80 megabytes of virtual memory, running under either the Windows 95 or Windows NT 4.0 operating system (or successor thereof).

Software that may be used to carry out the methods may be, for example, Microsoft Excel or Microsoft Access, suitably extended via user-written functions and templates, and linked when necessary to stand-alone programs that perform other functions. Examples of software or computer programs used in assisting in conducting the present methods may be written, preferably, in Visual BASIC, FORTRAN and C++. It should be understood that the above computer information and the software used herein are by way of example and not limitation. The present methods may be adapted to other computers and software. Other languages that may be used include, for example, PASCAL, PERL or assembly language.

A computer program may be utilized to carry out the above method steps. The computer program provides for (i) introducing pressured gas into a manifold of an apparatus wherein the manifold comprises a plurality of compartments and wherein the gas is introduced in a manner such that the gas velocity is diffused and the gas traverses the interior of an apparatus, including a chamber thereof, in a flow straightened manner to a gas outlet at an end of the apparatus opposite the manifold, (ii) securing a support to a support holding element, (iii) placing the support and the support holding element into a chamber of the apparatus, (iv) moving the support relative to dispensing nozzles of a reagent dispensing device, (v) dispensing monomeric reagents to predetermined sites on the surface of the support, (vi) moving the support for applying reagents other than the monomeric reagents to the surface of the support, (vii) optionally, repeating the above steps until the array of biopolymers is formed, and (viii) removing the support from the chamber of the apparatus. Another aspect of the present invention is a computer program product comprising a computer readable storage medium having a computer program stored thereon which, when loaded into a computer, performs the aforementioned method.

The above supports may be employed in various assays involving biopolymers. For example, following receipt by a user of an array made by an apparatus or method of the present invention, it will typically be exposed to a sample (for example, a fluorescent-labeled polynucleotide or protein containing sample) and the array is then read. Reading of the array may be accomplished by illuminating the array and reading the location and intensity of resulting fluorescence at each feature of the array. For example, a scanner may be used for this purpose where the scanner may be similar to, for example, the AGILENT MICROARRAY SCANNER available from Agilent Technologies Inc, Palo Alto, Calif. Other suitable apparatus and methods are described in U.S. patent application Ser. No. 09/846,125 "Reading Multi-Featured Arrays" by Dorsel, et al.; and U.S. patent application Ser. No. 09/430,214"Interrogating Multi-Featured Arrays" by Dorsel, et al. The relevant portions of these references are incorporated herein by reference. However, arrays may be read by methods or apparatus other than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583 and elsewhere). Results from the reading may be raw results (such as fluorescence intensity readings for each feature in one or more color channels) or may be processed results such as obtained by rejecting a reading for a feature that is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. An apparatus for conducting chemical reactions wherein plurality of drops of reagents are applied to the surface of a support in the form of array, said apparatus comprising:
    (a) a chamber,
    (b) a gas inlet for introducing a gas into the interior of said chamber,
    (c) a device for dispensing drops of reagents for conducting said chemical reactions in fluid communication with said chamber, and
    (d) an opening in said chamber for exit of said gas, wherein said opening is designed to provide a contracting section, a section having substantially constant cross-sectional area and a diffusing section through said opening.

2. An apparatus according to claim 1 wherein contraction in said contracting section takes place over a region from about 0.15 to about 2 times the width of said section having substantially constant cross-sectional area.

3. An apparatus according to claim 1 wherein said diffusing section expands at a rate of about 0.08 to about 0.18 cm/cm.

4. An apparatus for synthesizing a plurality of biopolymers on a support in the form of an array, said apparatus comprising:
(a) a chamber,
(b) a gas inlet for introducing a gas into the interior of said chamber,
(c) a device for dispensing reagents for synthesizing said biopolymers in the form of an array, said device being in fluid communication with said chamber, and
(d) an opening in said chamber for exit of said gas, wherein at least one wall of said opening is designed to provide a contracting section, a section having substantially constant cross-sectional area and a diffusing section through said opening.

5. An apparatus according to claim 4 wherein contraction in said contracting section takes place over a region from about 0.15 to about 2 times the width of said section having substantially constant cross-sectional area.

6. An apparatus according to claim 4 wherein said diffusing section expands at a rate of about 0.08 to about 0.18 cm/cm.

7. An apparatus according to claim 4 wherein said opening comprises a pair of side walls and both of said side walls of said pair are designed to provide a contracting section, a section of substantially constant cross-sectional area and a diffusing section through said opening.

8. An apparatus according to claim 4 further comprising a mechanism for moving said support into and out of said chamber and for positioning said support relative to said device for dispensing reagents.

9. An apparatus according to claim 8 further comprising a controller for controlling the movement of said mechanism for moving said support.

10. An apparatus according to claim 8 wherein said mechanism moves said support into and out of said chamber through said opening.

11. An apparatus according to claim 8 wherein said mechanism comprises a holding element for said support wherein said holding element is a low drag body having Reynolds numbers that are less than about 3000.

12. An apparatus according to claim 4 further comprising a manifold comprising at least two compartments, each of said compartments being in fluid communication with a respective gas inlet.

13. An apparatus according to claim 4 further comprising a mechanism for straightening the flow of a gas entering said gas inlet.

14. An apparatus according to claim 13 wherein said mechanism is a perforated element.

15. An apparatus for synthesizing an array of biopolymers on a support, said apparatus comprising:
(a) a chamber,
(b) a gas inlet for introducing a gas into the interior of said chamber,
(c) a device for dispensing reagents for synthesizing said biopolymers, said device being in fluid communication with said chamber,
(d) an opening for exit of said gas, said opening comprising a pair of side walls, wherein at least one of said side walls is designed such that said opening comprises a contracting section, a section having substantially constant cross-sectional area and a diffusing section, wherein contraction in said contracting section takes place over a region from about 0.15 to about 2 times the width of said section having substantially constant cross-sectional area and wherein said diffusing section expands at a rate of about 0.08 to about 0.18 cm/cm and
(e) a mechanism for moving said support into and out of said chamber through said opening and for positioning said support relative to said device for dispensing reagents, wherein said mechanism comprises a holding element for said support wherein said holding element is a low drag body having Reynolds numbers that are less than about 3000.

16. An apparatus according to claim 15 wherein both of said side walls of said pair of side walls comprise a contracting section and a diffusing section.

17. An apparatus according to claim 15 further comprising a controller for controlling the movement of said mechanism for moving said support.

18. An apparatus according to claim 15 further comprising a manifold comprising at least two compartments, each of said compartments being in fluid communication with a respective gas inlet.

19. An apparatus according to claim 15 further comprising a mechanism for straightening the flow of a gas entering said gas inlet, said mechanism comprising a perforated element.

20. A device comprising:
(a) a mechanism for moving a support into and out of a chamber and for positioning said support relative to a device for dispensing reagents to a surface of said support to form an array of biopolymer features thereon, said mechanism comprising a holding element for said support wherein said holding element is a low drag body having Reynolds numbers that are less than about 3000, and
(b) a controller for controlling the movement of said mechanism for moving said support.

* * * * *